United States Patent [19]

Aitken

[11] 4,047,739
[45] Sept. 13, 1977

[54] FITTING AND METHODS FOR MAKING THE SAME

[76] Inventor: W. Sidney Aitken, 10040 Benares Place, Sun Valley, Calif. 91352

[21] Appl. No.: 576,278

[22] Filed: May 12, 1975

Related U.S. Application Data

[63] Continuation-in-part of Ser. No. 388,071, Aug. 13, 1973, abandoned.

[51] Int. Cl.² ............................................. F16L 13/02
[52] U.S. Cl. ........................................ 285/21; 285/111; 285/369; 285/379; 285/423
[58] Field of Search ............. 285/423, 369, 379, 332, 285/DIG. 16, DIG. 10, DIG. 20, 21, 110, 111; 156/73; 264/68; 29/470.3

[56] References Cited

U.S. PATENT DOCUMENTS

| 2,933,428 | 4/1960 | Muellen | 285/423 X |
| 2,983,639 | 5/1961 | Jageman | 285/DIG. 16 |
| 3,117,903 | 1/1964 | Hix | 285/423 X |
| 3,226,807 | 1/1966 | Orr | 285/DIG. 16 |
| 3,260,540 | 1/1966 | Houot | 285/423 X |
| 3,265,410 | 8/1966 | Lorang | 285/423 X |
| 3,438,824 | 4/1969 | Balamuth | 156/73 X |

Primary Examiner—H. Hampton Hunter

[57] ABSTRACT

A unitary fitting for fluid piping systems. A body has a socket member, and a hub member fits in the socket member. The members define the bottom and sides of a ring groove, and a resilient sealing ring fits in the groove. Each of the members has a wall which is adapted to be brought into abutment with the other, and a structural joinder joins the walls. A preferred means to form the structural joinder is to rotate the hub member in the socket member while the walls are in abutment, whereby the frictional forces will generate sufficient heat to cause the walls to fuse together, especially when they are formed of a thermoplastic plastic material, such as polyvinyl chloride.

27 Claims, 23 Drawing Figures

FITTING AND METHODS FOR MAKING THE SAME

CROSS REFERENCE TO OTHER PATENT APPLICATION

This is a continuation-in-part of applicant's co-pending patent application, Ser. No. 388,071, filed Aug. 13, 1973, entitled "Fitting and Methods for Making the Same", now abandoned.

This invention relates to fittings for use in fluid piping systems, and especially to fittings which utilize deflectible seals, such as resilient solid sealing rings, and chevron rings.

It is a characteristic of this type of fitting that a body having a fluid passage therethrough includes a socket member, within which a deformable sealing ring is held in an internal ring groove. The diameter of the aperture in the sealing ring is smaller than the outer diameter of a pipe, so as to be deflected by the pipe and form a fluid seal. The conventional method of manufacturing fittings of this type is to cast a massive knob on a body and then machine the internal groove in the knob. This is a very expensive technique and frequently results in out-of-round ring grooves. An out-of-round ring groove is unacceptable, because it leads to leakage in usage.

A further undesirable feature of conventional fittings is that the thickness of the knob when cast is quite large, and the cycle time of a plastic molding machine to make it is relatively high, and the production rate is relatively low. Accordingly, the cost of the produced item, even before machining, is greatly increased. Furthermore, larger masses when cast tend to have void inclusions more frequently than thinner sections. Therefore, an increased risk exists of making scrap in the molding process.

Yet another disadvantage of cast articles is that a core must be in place while they are being cast, and the core must thereafter be removed. As a consequence, no part of the casting closer to the opening can have a smaller diameter than any part farther from the opening, or the core cannot be removed. This means that the mouth must be quite large, and that a pipe inserted into the fitting can be bent sidewise as a lever relative to the socket member, and tends to flatten out-of-round enough to permit leakage. This can occur, for example, when a heavy body, such as a vehicle, rolls over the ground above the joint.

With this invention, a hub member of reduced diameter can be fixed in a socket member of larger diameter, after the socket member is molded. Such an arrangement has the advantage that there can be some play between the pipe and the inside of the socket member when the pipe moves as a lever, and the tendency of the pipe to flatten is significantly reduced.

It is an object of this invention to provide a fitting which can be made from members with modest cross-sections that can be assembled into a larger solid construction.

It is another object of this invention to provide an inexpensive fitting construction wherein the critical dimensions relative to the ring can inexpensively and conveniently be held to very close tolerances, and the members of the fitting assembled in a low cost operation, whereby a construction is obtained which has very close dimensional tolerances where it matters, namely at the surfaces which support the ring.

Another object of this invention is to provide a means whereby the groove, once formed, remains circular, concentric, and in good alignment.

A fitting according to this invention includes a socket member and a hub member. A sidewall is formed on each of the socket and hub members, and an abutment wall is formed on each of the socket and hub members. A groove side face is formed on the hub member and, if desired also on the socket member, and a groove bottom surface is formed on one of them. In accordance with this invention, the hub member is placed in the socket member so that their sidewalls are in adjacency to one another, and their axes are in alignment.

According to a preferred but optional feature of the invention, the hub member is joined to the socket member by a fusion of their materials caused by friction between them developed as a consequence of moving one relative to the other.

According to another preferred but optional feature of the invention, the two members are made of materials with good insulating properties, and the wall thickness of the hub member is greater than that of the socket member, whereby to provide for greater dimensional stability of the hub member when these members are heated.

According to still another preferred but optional feature of the invention, a cavity is formed between the hub member and the socket member to receive slag formed by the heat of friction.

According to still another preferred but optional feature of the invention, an elastomeric sealing ring is in place between the socket member and the hub member when they are joined to one another, whereby to smooth out the slag which may be introduced into the groove so it does not prevent a good seal from being made.

The above and other features of this invention will be fully understood from the following detailed description and the accompanying drawings in which.

Figure 1:
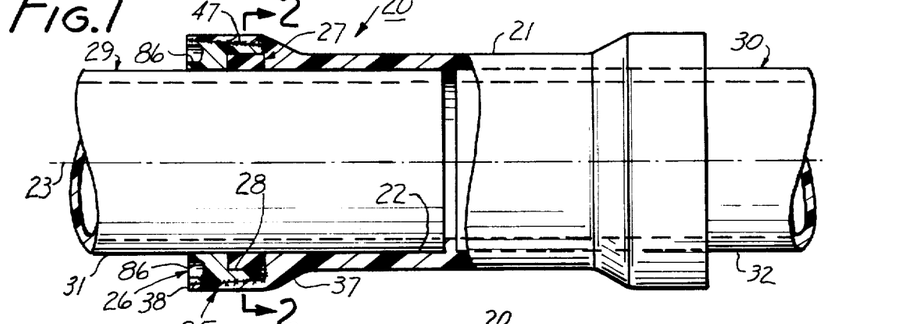
FIG. 1 is a side elevation, partly in cutaway cross-section, showing an embodiment of the invention.
Figure 20:
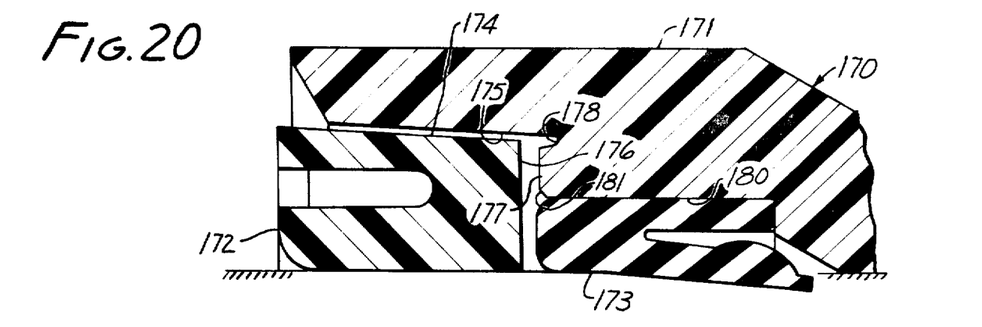
Figure 21:
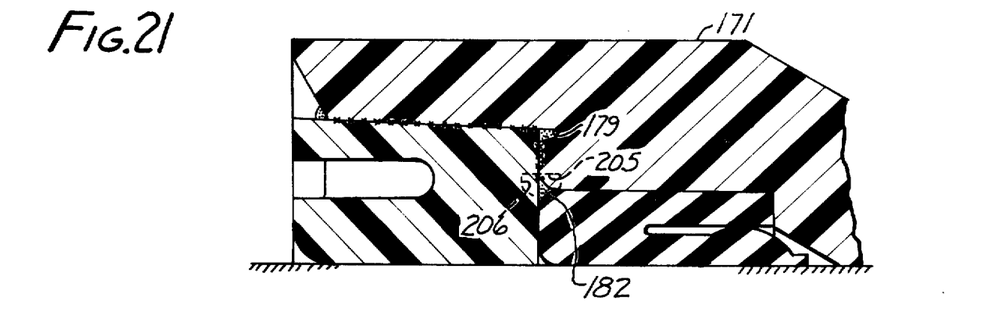
Figure 22:
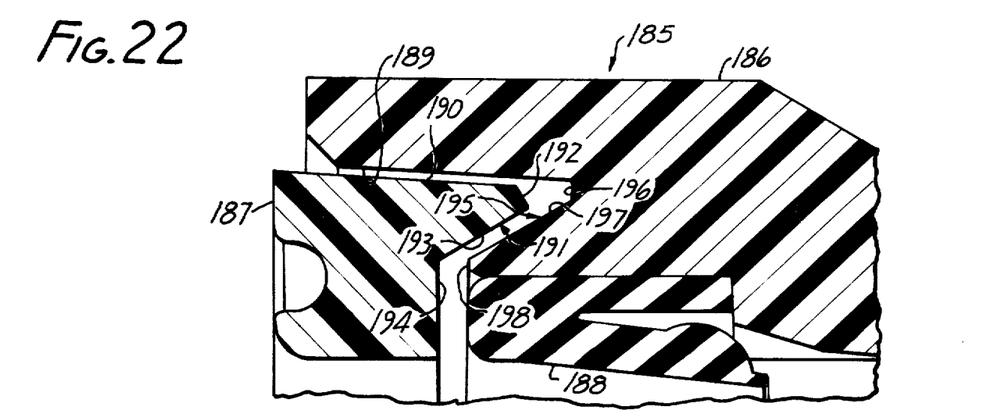
Figure 23:
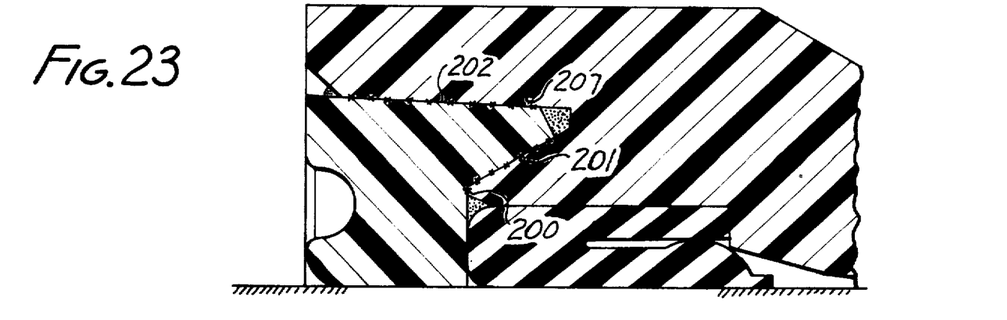

FIGS. 20 and 21 are fragmentary cross-sections of an alternate embodiment in loose and joined conditions, respectively; and FIGS. 22 and 23 are fragmentary cross-sections of another embodiment in loose and joined conditions, respectively; and FIG. 1 shows an embodiment of fitting 20 according to the invention. The fitting comprises a body 21 having a flow passage 22 extending therethrough along a central axis 23. The body comprises a socket member 25, a hub member 26, and a sealing ring 27 retained in a ring groove 28 formed between the hub member and the socket member. Pipes 29 and 30 are shown connected by fitting 20, which is the function of the fitting. The fluid seal is made by deflection of the sealing ring by the outer surfaces 31, 32 of pipes 29 and 30, respectively. This type of fitting is sometimes referred to as a "compression" fitting because the sealing is caused by compression, or more rigorously by deflection, of the seal material.

Fittings are known which have internal ring grooves holding internal resilient rings. As previously stated, it is an object of this invention to provide a very accurate ring groove made inexpensively.

Socket member 25 includes a socket sidewall 35 and a socket abutment wall 36. These are formed in each end of the fitting or at any other place in the fitting, for example at a third location if the fitting were a T, where the fitting opens for connection to a pipe.

The socket member has an enlarged section 37 which accommodates a counterbore formed by the socket sidewall. Preferably, but not necessarily, the socket sidewall has a draft angle ($\alpha$) of approximately 2½ degrees (5° conical) opening toward the open end 38 of the socket member. Therefore, socket sidewall 35 is frustoconical. It terminates at socket abutment wall 36 which is planar. Sidewall 35 is concentric with axis 23, and wall 36 is normal to axis 23.

The socket abutment wall can have two functions, and therefore its radially innermost portion (numbered 39 in FIG. 3) is sometimes also referred to as a groove side face 39. It may or may not be coplanar with the remainder of abutment wall 36, as will later be discussed. Instead, it may be axially spaced from it.

Hub member 26 is a ring-shaped body having a central opening 40 to pass pipe 29. It has a hub sidewall 41 and a hub abutment wall 42. Under certain circumstances, socket abutment wall 36 and hub abutment wall 42 will abut and be joined to one another by a structural joinder.

The hub member also includes a groove side face 43 and a groove bottom surface 44. Bottom surface 44 is cylindrical and extends peripherally around the central axis 23 in alignment therewith. The accuracy of its diameter, its concentricity, and its circularity when the hub member is fixed in the socket member are important features of the invention.

Hub sidewall 41 also has a draft angle, preferably of the same angularity as the socket sidewall 45. It may be slightly oversized relative to the socket sidewall, for example, by approximately 0.001 inch on the diameter, whereby to form an interference fit. Hub sidewall 41 in this embodiment is also a frustoconical surface of revolution.

Ring groove 28 is defined as the spacing between groove side faces 39 and 43, bounded by bottom surface 44. There may, in some embodiments, also be a spacing between the socket abutment wall 36 and hub abutment wall 42 so that they will not in fact be in abutment, and a clearance may exist between them. This means that under such circumstances the groove bottom surface 44 will not interconnect both groove side faces, but this is of no importance to the invention.

Sealing ring 27 is seated in the ring groove in contiguity with bottom surface 44. It projects radially inside both of the side faces in order that a compressive force may be exerted on the pipe. Preferably, a clearance 46 will be provided between the ring and one or both of the side faces in order that the resilient, but incompressible, elastomeric material of the sealing ring may have some place in which to move when it deforms. Should this place not be provided, then deformation will occur along the pipe itself, which is also an acceptable arrangement. A suitable set of dimensions (in inches) for a two-inch fitting of this type is as follows:

| | |
|---|---|
| A. | 3.400 |
| B. | 3.088 |
| C. | 2.800 |
| D. | 2.405 |
| E. | 2.360 |
| F. | 2.722 |
| G. | 2.388 |
| H. | 1.460 |
| K. | 0.498 |
| L. | 0.995 |

A desirable feature of the fitting according to this invention is its suitability for use with both high pressure and low pressure fittings. The rectangular sectioned ring shown in FIG. 3, or its equivalents such as solid O-rings, is suitable for relatively lower pressures where reliance is had upon the resilience of the material to make the seal. Chevron-type seals are used for higher pressure ranges.

Figures 3, 4, 5:
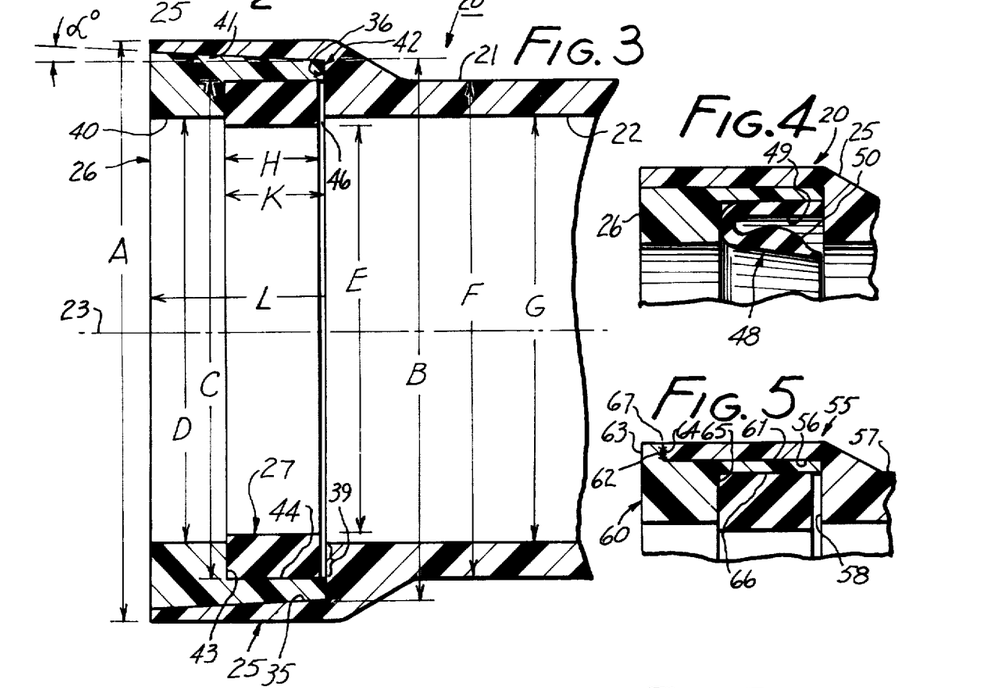
FIG. 3 is an enlarged fragmentary axial cross-section of FIG. 1.

FIG. 4 shows fitting 20 utilizing a chevron-type ring-seal 48 which utilizes the pressure of the fluid being sealed to spread its arms 49, 50 apart to make a more reliable seal. These seals are well known in the art and require no further description here, because they form no part of the instant invention.

A structural joinder 47 joins all of the walls together.

An important feature of the invention resides in methods for joining the hub member and the socket member together. These methods will be discussed after alternative constructions of the fitting are disclosed. FIGS. 5–8 show alternative constructions of hub members and socket members.

In FIG. 5, a socket member 55 is shown which has a socket sidewall 56 bounding a counterbore in the end of a body 57. A groove side face 58 extends laterally relative to the central axis as in FIG. 1. Socket sidewall 56 is a straight cylinder.

Hub member 60 has a hub sidewall 61 of substantially the same diameter as sidewall 56. It may make a light press fit or even a relatively loose fit. An abutment wall 62 is formed on the end of the socket member, and a flange 63 on the hub member carries an abutment wall 64. The two abutment walls are flat annuli lying normal to the central axis of the fitting. The hub member also carries a groove side surface 65 and a groove bottom face 66. Structural joinder 67 is made between the two abutment walls in a manner yet to be described.

Figures 2, 6, 7, 8:
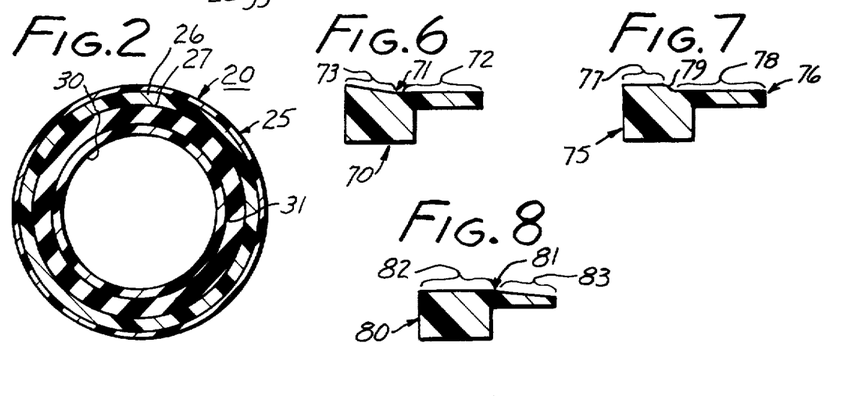
FIG. 2 is a cross-section taken at line 2—2 of FIG. 1.
FIGS. 4–8 are fragmentary axial cross-sections showing other embodiments of the invention.

FIG. 6 shows an alternative form of hub member 70 which can be utilized with either of the sockets of FIGS. 1 and 5. It differs from hub member 26 only in that its hub sidewall 71 has two portions, a first straight portion 72 and a second tapered portion 73. For reasons which will become evident, structural joinder between the hub member 70 and the socket member will occur at tapered portion 73.

Similarly in FIG. 7, a hub 75, identical to hub member 26 except for its outer hub sidewall 76, is shown. Hub member 75 includes first and second straight cylindrical portions 77, 78 joined by a curved portion 79, the diameter of portion 77 being greater than that of portion 78. Structural joinder in this construction, when hub member 75 is used with socket member of FIGS. 1 or 5, will occur at straight portion 77 and perhaps at part of curved portion 79.

FIG. 8 shows another embodiment of hub member 80 for use with either of the socket members of FIGS. 1 or 5 and identical to hub member 26, except for its hub sidewall 81, which includes a straight cylindrical portion 82 and a tapered portion 83. This is a reversal of the construction of FIG. 6, and in this case, structural joinder may be expected to be formed at the straight cylindrical portion 82 which has a diameter larger than the major portion of the tapered portion.

This invention is especially useful in the manufacture of thermoplastic plastic fittings. A significant feature of such materials, for example, polyvinyl chloride, polyethylene, polypropylene, and ABS, all characterized as being thermoplastic, is that they are also good insulators. Accordingly, their surfaces may be heated without substantially changing the temperature of the entire body and of distorting it thermally. This permits the use of frictionally developed forces and the heat which they generate for the purpose of assembly. It may be said that the more crystalline materials are more difficult to spin-weld or vibration-weld, but are readily ultrasonically welded. The materials which are more amorphous are better for spin-welding or vibration-welding. ABS is the best material known at present for this class of welding. However, even though there may be some greater convenience with one than with another, the motion fusion processes can be made to work satisfactorily on most thermoplastic materials. Lower molecular weight materials appear to work better.

Figure 9:
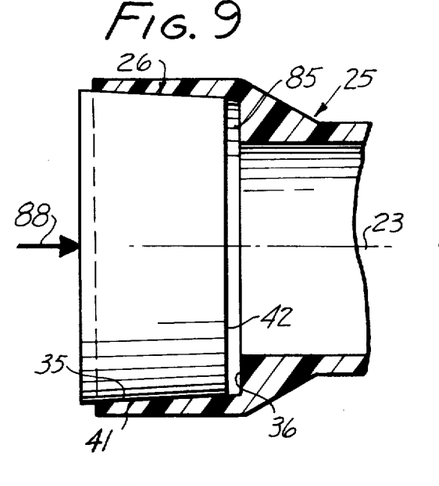
FIGS. 9 and 10 are fragmentary elevations, partly in cutaway cross-section, showing two steps in the preferred method of manufacturing the fitting.
Figure 10:
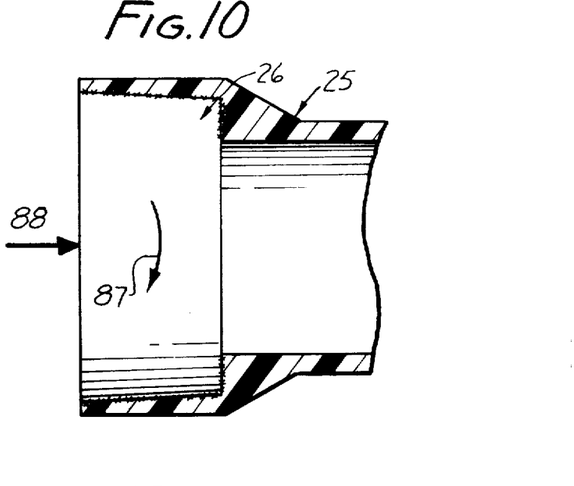

FIGS. 9 and 10 show the preferred method for assembling the device of FIG. 1. In FIG. 9 socket member 25 and hub member 26 are shown being brought together, and the spacing 85 shown between them represents the axial displacement along axis 23 which results as a consequence of the interference fit. If there were no interference fit between the sidewalls, then the abutment walls would fit initially together in full contiguity. In the preferred embodiment, the hub member is gripped, such as by placing driver means (not shown) into recesses 86 (FIG. 1) in its end and rotating the hub member, as schematically illustrated by arrow 87, while at the same time applying an axial force, as indicated by arrow 88. As a consequence of this relative rubbing motion, friction will rapidly heat those ones of the walls which abut one another. In a brief time, perhaps in only one or two seconds, the necessary amount of axial movement between the parts can occur to overcome the interference. For this reason, in the assembled illustration of FIG. 3, the wall dimensions of the hub member and the socket member are shown as equal to one another.

Initially, the outer diameter of the hub member will have been greater by the amount of interference. Because the wall thickness of the hub member is greater than that of the socket member, it is the socket member which will yield the most. It is an advantage that all radial wall thicknesses of the hub member be greater than the surfaces of the socket member which they abut for the reason that, for a given quantum of heat generated, the temperature of the hub member will increase the least, thereby resulting in least thermal effect on the groove side face and the bottom surface of the hub member, which should be undistorted. In assembling a two-inch fitting, it has been found that somewhere between four and eight turns at approximately 100 rpm will result in a firm binding joinder of all of the wall surfaces. The device with the dimensions illustrated made of polyvinyl chloride will feel warm to the hand just after joinder, and a firm structural bond, fully resistant to the forces generated by fluid on the fitting, will have been developed. The important feature of the joinder is a complete peripheral fluid-sealing structural joint, and it may be provided between either the abutment walls or between the side walls, or between both, as preferred, so long as sufficient area of joinder is provided.

For example, in FIG. 5 there may or may not be a structural joinder formed between the sidewalls, but there is one between the abutment walls 62 and 64. Should a joinder between the sidewalls also be desired, then the dimensions will have been arranged accordingly.

In all of the embodiments of FIGS. 6, 7 and 8, the rotational technique of assembly just described will cause a structural joinder to occur between contiguous walls, which are forced to bear against one another when the hub member is pressed into the socket member, and the hub member and socket member are rotated relative to one another.

Figure 11:
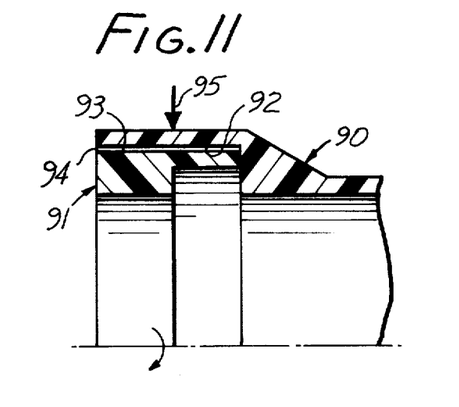
FIGS. 11 and 12 are fragmentary axial cross-sections showing two steps in an alternate method of manufacturing the fitting.
Figure 12:
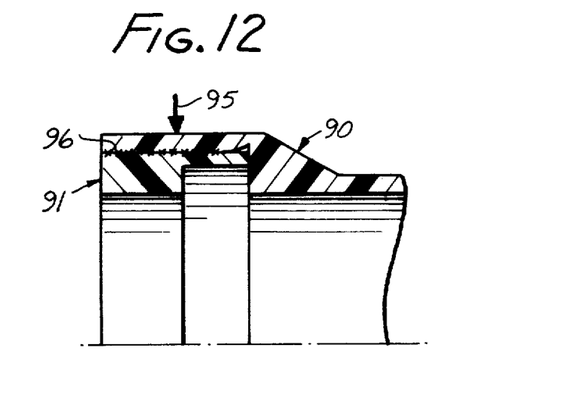

FIGS. 11 and 12 illustrate that a structural joinder resulting from friction can be obtained, even without an interference fit, by pressing them together in bearing relationship during the spinning operation. FIG. 11 shows a socket member 90 and a hub member 91, whose sidewalls 92, 93, respectively, have an initial clearance 94 between them before assembly. At the time of assembly, a collet is utilized to squeeze the socket sidewall toward and against the hub sidewall, this force being schematically illustrated by arrow 95. At this time, the hub is rotated, and structural joinder 96 is formed at the place were they are held against each other during this operation.

Figure 13:
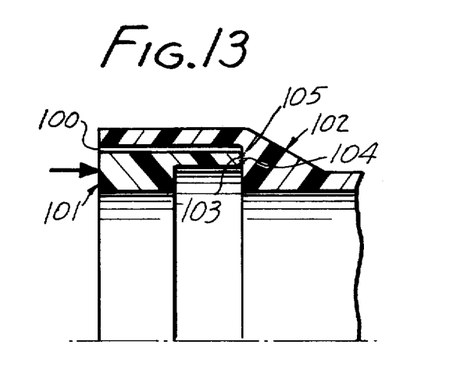
FIGS. 13 and 14 are fragmentary axial cross-sections showing other structural joinders useful with this invention.

FIG. 13 illustrates an embodiment similar to that of FIG. 11 where a clearance 100 is formed between the hub member 101 and socket member 102, there being an abutment wall 103 on the socket member and an abutment wall 104 on the hub member which make contact with each other so as to form a joinder 105.

Figure 14:
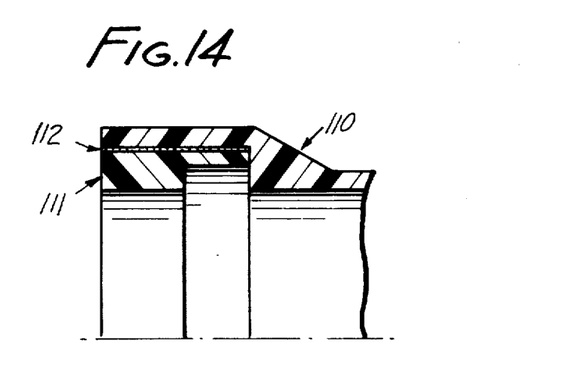

FIG. 14 shows a socket member 110 and a hub member 111 joined together by a layer of cement 112, which is a chemical or settable type of bond, or a suitable solvent joinder, rather than by a self-bond, such as is caused by the heat joinders heretofore described. Any suitable cement or sealant, for example, the well-known anaerobic sealant "Loctite", or any other suitable substance may be utilized. A solvent will soften the two surfaces so they can merge, and the solvent will gradually migrate from the part, leaving a structural joint.

Occasionally, a leakage path might occur in some of the embodiments of FIGS. 1–4 because of slag inclusions, and also because with spin-welding it is difficult to assure that there will always be a continuous peripheral seal between two axially-extending walls, for example between two tapered nearly cylindrical walls. It has been found that a butt-weld is more reliable in production, provided that a place is provided to which the slag which is produced by the spin-welding operation can flow. It is undesirable for the slag to remain in the butt-weld itself, and it is preferable for it not to project into the ring groove in such a way as to wrinkle the flexible seal.

The term "slag" means plastic material which is displaced during the spin-welding operation. The butt-weld preferably has a relatively small cross-section so as to assure a complete fused structural joinder. Of course, the other surfaces may also be joined, but primary reliance is placed on the butt joinder, and assurance is first sought that this joint is complete. The other joinders are of secondary importance, and merely provide additional structural strength.

In the embodiments of FIGS. 15–23, the rubber ring is put in place while the parts are still loosely assembled. When the part is formed, the ring smoothens ("irons out") any slag that enters the ring groove. This arrangement provides a slag layer, rather than a "lump". A lump might prevent a good seal. The smooth conforming layer permits a good seal to be made, because it does not wrinkle the ring.

Also in the embodiments of FIGS. 15–23, "reservoirs" may be provided for the slag to flow into, so that it will not flow to undesired locations where it might prevent a fluid-sealing joinder from being made.

Figure 15:
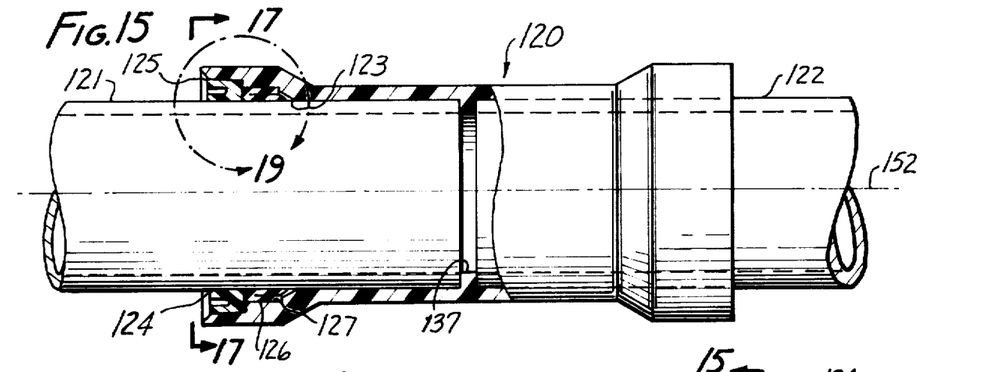
FIG. 15 is a side elevation partly in cutaway cross-section, showing the presently-preferred embodiment of the invention.

The presently preferred embodiment of fitting 120 according to this invention is shown in FIG. 15. It is shown joining two pipes 121, 122 together. It includes a socket member 123 with an open mouth facing to the left (for a socket member which opens in two directions, the construction is multiplied with like structure at both ends). A hub member 124 is attached inside opening 125 of socket member 123, and a flexible chevron sealing ring 126 is placed in a ring groove 127 formed by the socket member and by the hub member.

The sealing ring (FIG. 16) is conventional. It includes a pair of flanges 128, 129 which are continuous with a bight 130. The bight includes a pair of curved outer corners 131, 132. In the unflexed condition when no pipe is in the fitting, the inside flange 129 will project within the boundaries defined by the hub member and socket member in order to make a compressible press fit with the pipe when the pipe is inserted. Insertion of the pipe compresses the seal. Spacing 133 (FIG. 18) is shown between flanges 128 and 129, and a bead 134 extends into space 133.

The hub member includes a peripheral groove 135 with shoulders 136 to be engaged by a driving tool for turning the hub member when it is to be spin-welded to the socket member. A stop 137 is formed inside the fitting which the pipe may strike to limit its insertion into the fitting.

Figures 16, 17, 18:
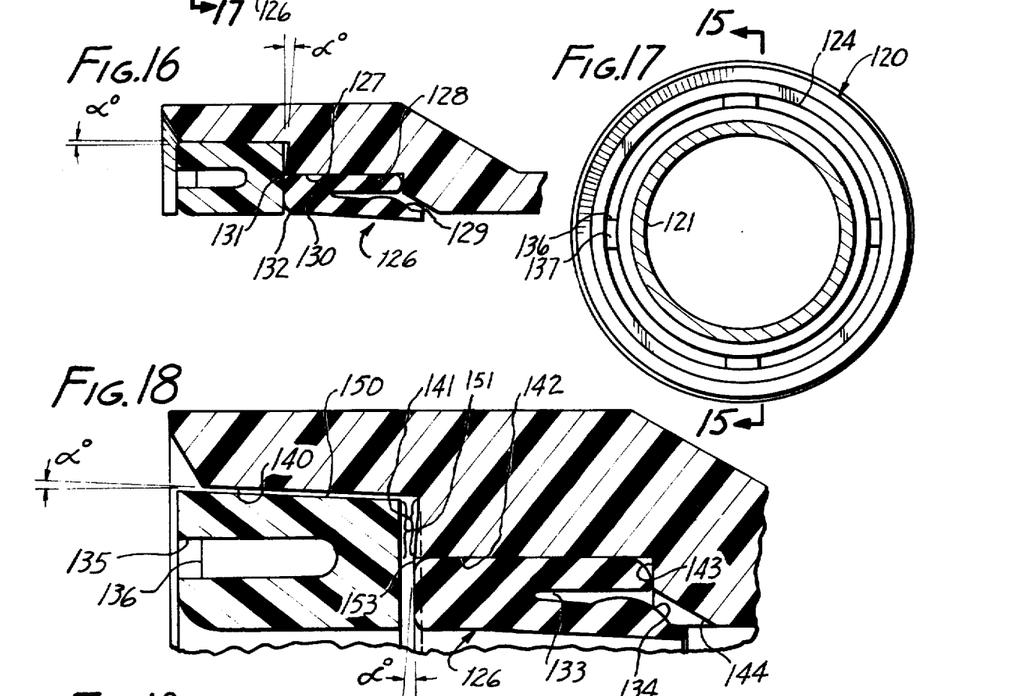
FIG. 16 shows the parts of the assembly of FIG. 15 just before joinder.
FIG. 17 is a cross-section taken at line 17—17 in FIG. 15.
FIG. 18 shows the parts of FIG. 15 loosely assembled.

As best shown in FIG. 18, the socket member is provided with a socket sidewall 140 and a socket abutment wall 141. Each these has a draft angle $\alpha$, usually about 20. The purpose of the draft angle on sidewall 140 is to facilitate removal of the core after the casting operation, and the purpose of the draft angle on abutment wall 141 is to provide for a reservoir yet to be described. The socket member also includes a ring groove bottom surface 142 and a ring groove side face 143 to accommodate the flexible sealing ring 126. A chamfer 144 is provided for receiving a portion of the sealing ring.

Figure 19:
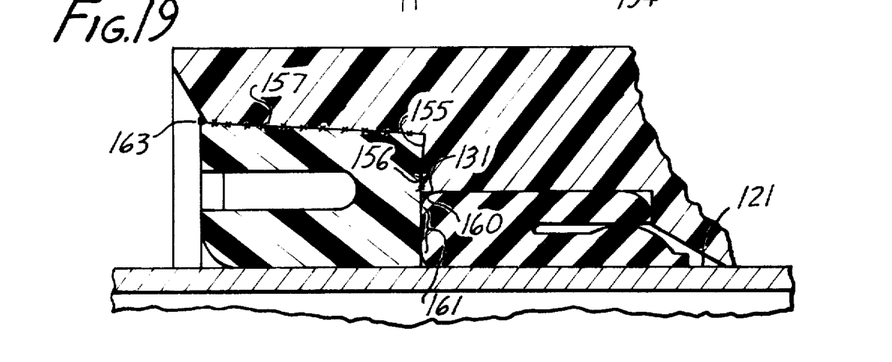
FIG. 19 is an enlargement of a region within line 19—19 in FIG. 15.

The hub member includes an outer hub sidewall 150 and a hub abutment wall 151. Sidewall 150 preferably has a draft angle about equal to that of the socket sidewall 140, but abutment wall 151 will lie substantially normal to axis 152. As can be seen in FIG. 18, the dimensions are such that the hub can loosely be fitted into the socket member and, then as can be seen in FIG. 16, just makes contact between the hub abutment wall 151 and edge 153 of the socket abutment wall, still leaving a very small clearance between the sidewalls (too small to be shown in FIG. 16). Accordingly, when the hub member is spun into the socket member, the abutment walls will fuse together over a substantial annular area, as shown in FIG. 19, and a small reservoir 155 will be formed to receive the slag, i.e., material displaced from the abutment walls. This slag will not interfere with the fusion 156 between the abutment walls. This is the important and peripheral joinder and makes a fluid-tight seal. There is an additional fusion 157 which will occur in properly-proportioned parts between the sidewalls, and this occurs as the hub member moves into the socket member and the sidewalls come into contact during the spinning. This is for additional structural integrity, but will not be primarily relied on for fluid-sealing continuity.

In addition, a second reservoir 160 (FIG. 19) is formed between the curved outer corner 131 of the sealing ring and a portion 161 yet to be described. This is a particularly interesting reservoir because, with the resilient ring in place during the spinning operation, the hot slag will tend to be wiped to form a smooth annular body which will occupy the reservoir without displacing or wrinkling the seal. Accordingly, not only is there a continuous fluid seal between the abutment walls of the hub member and the socket member, but also there is an unimpeded contact between the seal and the ring groove bottom surface and between the seal and portion 161 of the hub member adjacent to its abutment wall. Portion 161 acts as a ring groove sidewall, and sometimes is referred to as "ring groove sidewall 161". There results a structurally integral, dependably fluid-sealing construction. Some slag 163 may also escape at the open end of the fitting, but it is of no importance as to fluid-sealing.

FIGS. 20–23 show other locations for reservoirs according to this invention and means for constructing them. For example, in FIG. 20 fitting 170 includes a socket member 171, a hub member 172 and a sealing ring 173. These are shown loosely assembled in FIG. 20, and it will be noted that hub sidewall 174 and socket sidewall 175 have a draft angle, while the hub abutment wall 176 and socket abutment wall 177 do not. Instead, walls 176 and 177 are normal to the central axis. However, an annular reservoir groove 178 is formed to receive slag 179 (FIG. 21). Similarly, the socket ring groove bottom surface 180 may be undercut by chamfer 181 to form a reservoir 182 additional to and enlarging the reservoir formed adjacent to the corner of the resilient ring in the event that the slag emission at this point is so great as to require the additional reservoir volume.

As in the embodiment of FIG. 15, the abutment walls will first be brought into contiguity, and then while they spin and fuse together, as shown in FIG. 21. Secondary fusion can occur between the sidewalls. The same advantages are attained as in the embodiment of FIG. 15.

FIGS. 22 and 23 show another embodiment, wherein a greater and more concentrated amount of fusion can be secured by modifying the shape of the abutment walls. In this fitting 185, there is a socket member 186, a hub member 187 and a sealing ring 188. The socket and hub sidewalls 189, 190 may have a draft angle as in FIG. 20. However, the abutment walls are considerably different. In this case, the hub abutment wall 191 has undercut segment 192, and intermediate segment 193 and a fusion segment 194. Similarly, the socket abutment wall 195 has an undercut segment 196, an intermediate segment 197 and a fusion segment 198. The fusion segments are annular, normal to the central axis, and of relatively small area, so that a deep, relatively small area fusion weld 200 is formed at their joinder. There may be fusion 201 also at the intermediate segments and fusion 202 at the outer sidewalls, but primary reliance for sealing purposes is placed on weld 200.

FIG. 21 also shows an optional means for providing a reservoir, instead of the one shown adjacent to the ring. This is a pair of undercuts 205, 206 formed respectively in the hub member and in the socket member. These are optional, and ordinarily will not be preferred.

The embodiments of FIGS. 15-23 thereby show structures and methods for assuring a full, peripheral, fluid-sealing weld between the hub member and the socket member and means for disposing of slag in such a way as not to distort the flexible ring and to be certain that the weld is further shielded from the fluid in the pipe by undistorted surfaces of the fluid-sealing ring.

The terms "fusion" and "fusion weld" are synonymous with "structural joinder".

The term "motion fusion" as used herein means ultransonic welding, spin-welding, and vibration-welding. Ultrasonic welding can be used to weld these structures together the same as spin-welding, and with substantially the same results. Ultrasonic welding is "motion fusion", because it results from heat produced by the rapid relative vibration of the contiguous surfaces. Only endwise pressure, without rotation, will be needed when ultrasonic welding is used.

"Spin-welding" is the process of creating heat for fusion by rotating one part relative to another. "Vibration welding" is the process of creating that heat by rapid back and forth rubbing motion, either angular or translational, or a combination. With motion fusion, it has been found desirable to hold the part motionless for a moment after the motion ceases to let the joinder "set" before removing the compressive force. For example, a joint to be spin-welded might be spun for one to three seconds, with axial pressure exerted. Then the spinning would be stopped, and the axial force maintained for about ⅛ to 1 second before releasing the part.

Vibration-welding appears to be best suited for joining crystalline thermoplastic resins, such as acetal, nylon, polyethylene, and polypropylene, which are not as easily joined by ultrasonics, solvents, or spin-welding as more amorphous plastics, such as polystyrene, ABS, acrylic, and polycarbonates. It is also successful with fluorocarbon and fluoropolymer plastics, and with polyester elastomer.

The term "abutment surface" means a surface which is so oriented that axial forces against it are primarily transmitted as axial forces, rather than as radial components. Therefore, an "abutment" will make an included angle with the axis greater than about 45°. A sidewall will make a lesser angle, because its orientation primarily transmits radial forces.

In making the structural joinder by friction as heretofore described, it is necessary to generate a temperature at the surfaces which are to join one another of at least approximately 300° F., which is not difficult to do. The device which rotates the hub member relative to the socket member may have an overriding clutch to release the drive once the parts have become assembled. In fact, it will be found that after they have initially softened sufficiently, they will grab each other and prevent further rotation relative to one another. Similar considerations govern the usage of ultrasonic and vibration-welding.

It will be noted that the hub member and the ring groove are concentric and round because they are molded that way. Further, the hub member is massive enough that it will stay that way throughout the mechanical and thermal processing which it undergoes. The axial alignment of the hub member relative to the socket member is not especially important, so long as sufficient clearance exists inside the body to receive a pipe, even if it is somewhat out of line.

In addition to heat being generated by the exertion of mechanical forces, it is possible to use other techniques for fusing the wall surfaces when brought together. For example, the wall surfaces may be quickly heated to temperatures suitable for fusion, such as in a hot oven, or by air blast, or by other means, whereupon the hub member and socket member may quickly be pressed together, but without rotation.

It will be noted from the foregoing that it is unnecessary to provide walls which are not used to make structural joinders. For example, if structural joinder is to be made only at the sidewalls, then the abutment walls need not be provided, and vice versa.

The term "structural joinder" means a region of attachment of the strip members. When they are joined by fusion, it is the fused region. When they are joined by compositions, such as adhesives or sealants, the structural joinder is the interconnecting composition.

Wherever spin-welding is used for heating, the contiguous surfaces will be surfaces of revolution generated around the central axis so they will be in contiguity when the hub member spins in the socket member. Vibration-welding is most conveniently accomplished with such surfaces.

It is also evident that both groove side surfaces can be formed in the hub member and none on the socket member. Also, only one groove side face need be provided (on the hub) for retention of the ring under pressure. Accordingly, a second groove side face, or one on the socket member, may be unnecessary.

This invention is not to be limited by the embodiments shown in the drawings and described in the description, which are given by way of example and not of limitation, but only in accordance with the scope of the appended claims.

I claim:

1. A fitting comprising a body having a flow passage therethrough; a socket member on said body having an opening, a central axis, a peripheral socket abutment wall, and a peripheral socket sidewall in said opening; a ring-like hub member in said opening, said hub member having a peripheral hub abutment wall, a peripheral ring groove face, and a hub sidewall; a peripheral ring groove bottom surface on one of said members facing inwardly toward said central axis and adjacent to the said ring groove face; said members being made of a thermoplastic material, which material is fusible to like material by motion fusion, said abutment walls extending non-parallel to the axis, and being joined together solely by fusion of the surface materials of the abutment walls, all radial dimensions of the socket member from the socket sidewall to and including the opening end of the socket member being greater than any radial dimension of the hub member, there being no radial overlap of the hub member by any part of the socket member at said end of the socket member; and a resilient sealing ring in the ring groove formed by the ring groove face and ring groove bottom surface.

2. A fitting according to claim 1 in which one of the abutment walls prior to joinder forms a different angle with the central axis than the other, whereby to form a reservoir for reception of slag away from the ring groove and between the members.

3. A fitting according to claim 2 in which prior to joinder an angle opens between the walls, opening away from said axis.

4. A fitting according to claim 2 in which at least some of the slag from the motion fusion is contained in said reservoir.

5. A fitting according to claim 1 in which both of the sidewalls form an angle with the central axis, and come into contiguity with one another when the abutment walls are fused together.

6. A fitting according to claim 5 in which a motion fusion joinder is formed between the sidewalls.

7. A fitting according to claim 5 in which one of the abutment walls prior to joinder forms a different angle with the central axis than the other, whereby to form a reservoir for reception of slag away from the ring groove and between the members.

8. A fitting according to claim 7 in which prior to joinder an angle opens between the walls, opening away from said axis.

9. A fitting according to claim 2 in which one of the abutment faces lies normal to the central axis.

10. A fitting according to claim 1 in which the sealing ring includes an outer bend which is spaced from the intersection of the ring groove face on the hub with the ring groove bottom surface, whereby to form a reservoir for reception of slag.

11. A fitting according to claim 1 in which a peripheral reservoir for reception of slag is formed in one of said walls.

12. A fitting according to claim 11 in which the peripheral reservoir for reception of slag is formed in the socket abutment wall.

13. A fitting according to claim 11 in which the peripheral reservoir for reception of slag is formed in the hub abutment wall.

14. A fitting according to claim 11 in which the peripheral reservoir for reception of slag is formed in the socket sidewall.

15. A fitting according to claim 10 in which a peripheral reservoir for reception of slag is formed in one of said walls.

16. A fitting according to claim 15 in which the peripheral reservoir for reception of slag is formed in the socket abutment wall.

17. A fitting according to claim 15 in which the peripheral reservoir for reception of slag is formed in the hub abutment wall.

18. A fitting according to claim 15 in which the peripheral reservoir for reception of slag is formed in the socket sidewall.

19. A fitting according to claim 1 in which at the point of fusion the lateral wall thickness of the hub member is generally greater than that of the socket member.

20. A fitting according to claim 2 in which at the point of fusion the lateral wall thickness of the hub member is generally greater than that of the socket member.

21. A fitting according to claim 1 in which the ring groove bottom surface is disposed on the socket member.

22. A fitting according to claim 21 in which one of the abutment walls prior to joinder forms a different angle with the central axis than the other, whereby to form a reservoir for reception of slag away from the ring groove and between the member.

23. A fitting according to claim 1 in which the ring groove bottom surface is on the hub member.

24. A fitting according to claim 23 in which one of the abutment walls prior to joinder forms a different angle with the central axis than the other, whereby to form a reservoir for reception of slag away from the ring groove and between the member.

25. A fitting according to claim 1 in which a peripheral ring groove face is also formed on the socket.

26. A fitting according to claim 2 in which a peripheral ring groove face is also formed on the socket.

27. The method of assembling a ring-shaped hub member of a fitting in a circular opening in a socket member comprising pressing an abutting wall of each member against the other with a resilient ring placed in a ring groove that is contiguous to both abutting walls, said ring groove having an edge adjacent to both of said abutting walls which forms a peripheral reservoir, and generating heat by means of motion fusion, whereby to fuse the members together at said abutting walls and to discharge slag from the joinder into said reservoir, the wall thickness of the hub member at the point of fusion being greater than the wall thickness of the socket member, whereby distortion of the socket member as a consequence of the heat is minimized.

* * * * *